R. N. CHAMBERLAIN, H. E. PRATT & A. S. HUBBARD.
STORAGE BATTERY.
APPLICATION FILED DEC. 17, 1906.
930,728.
Patented Aug. 10, 1909.
3 SHEETS—SHEET 1.
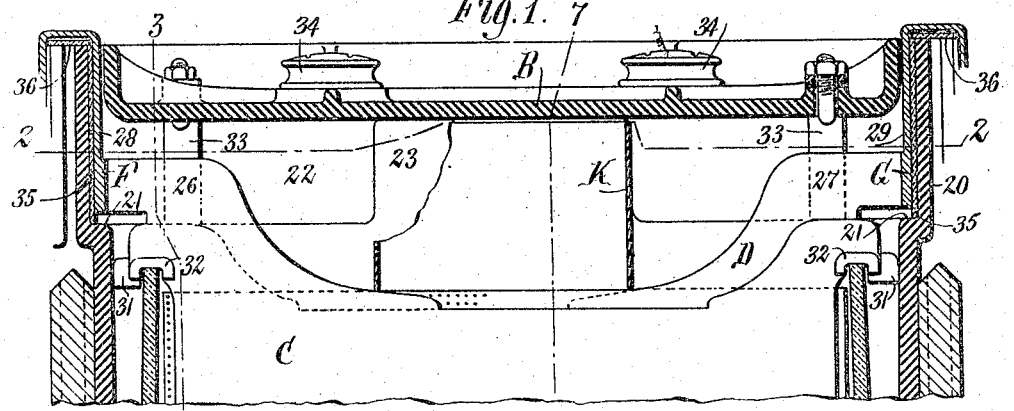
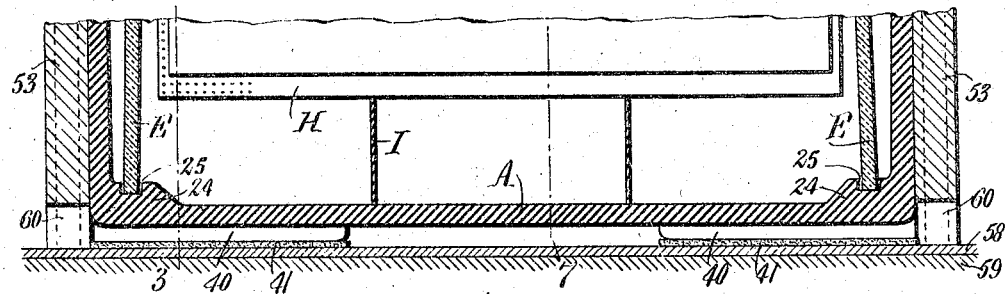
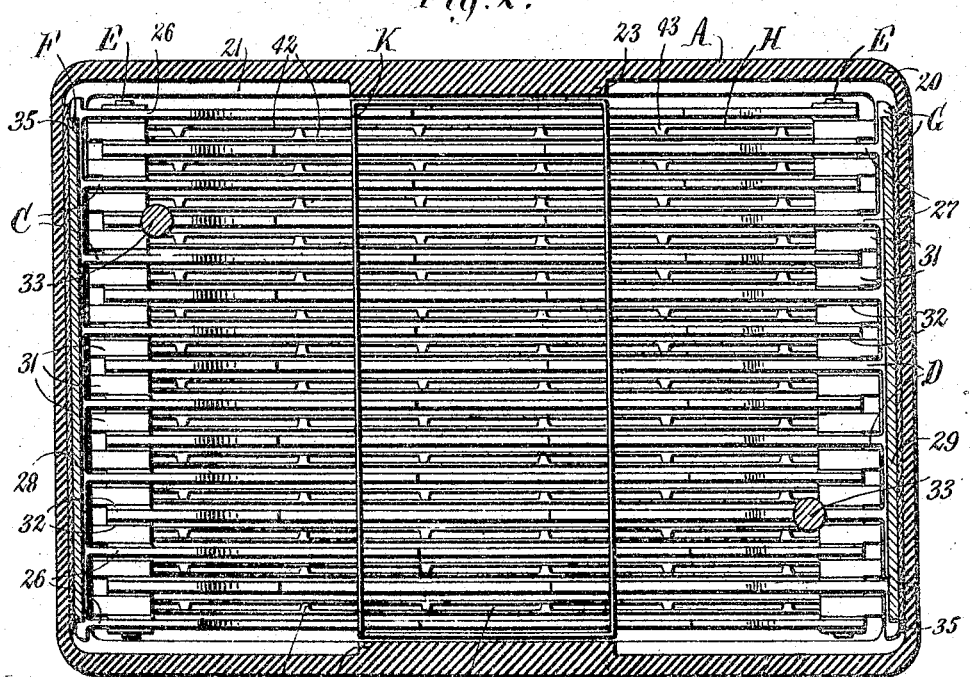
Witnesses:
E. A. Volk.
O. G. Dimon.
Rufus N. Chamberlain, Inventors
Herbert E. Pratt
Albert S. Hubbard
By Wilhelm Parker & Ward Attorneys R. N. CHAMBERLAIN, H. E. PRATT & A. S. HUBBARD.
STORAGE BATTERY.
APPLICATION FILED DEC. 17, 1906.
930,728.
Patented Aug. 10, 1909.
3 SHEETS—SHEET 2.
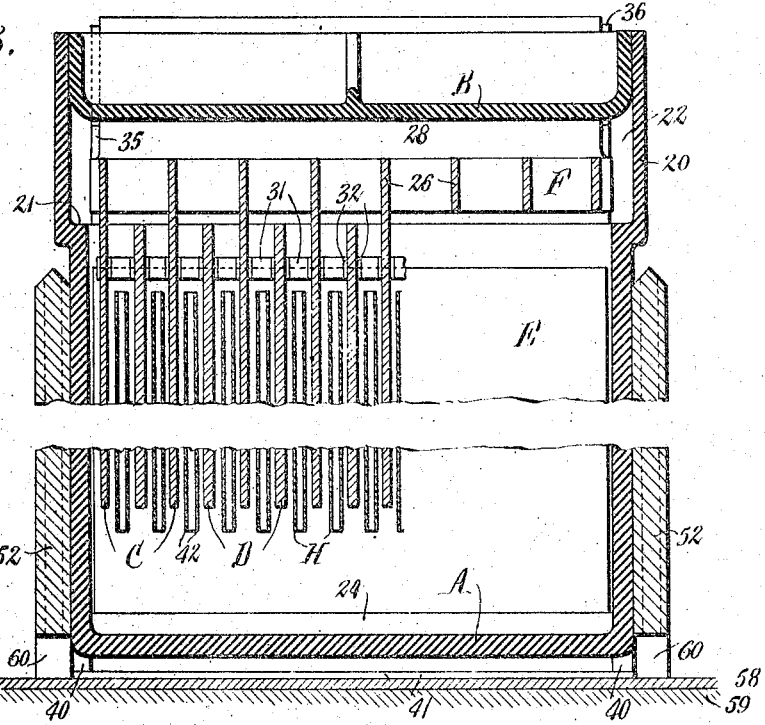
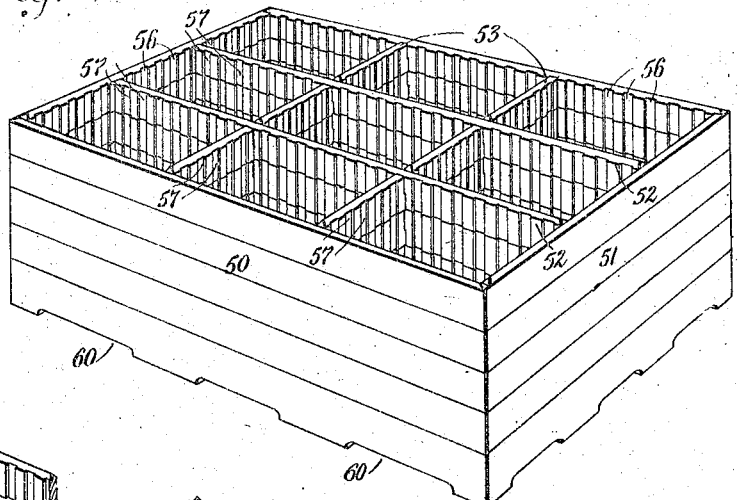
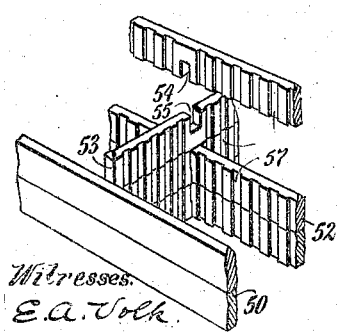

R. N. CHAMBERLAIN, H. E. PRATT & A. S. HUBBARD.
STORAGE BATTERY.
APPLICATION FILED DEC. 17, 1906.
930,728.
Patented Aug. 10, 1909.
3 SHEETS—SHEET 3.
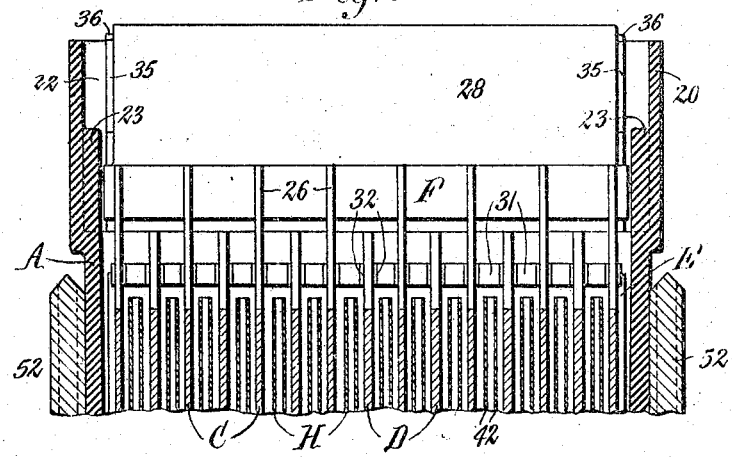
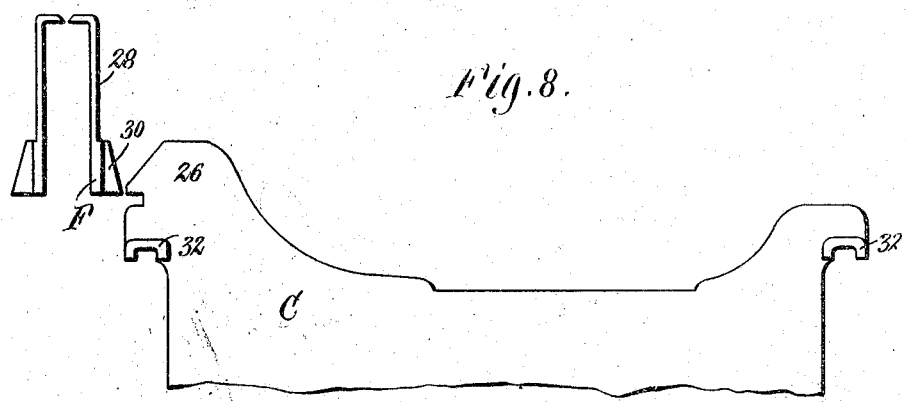
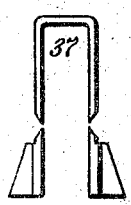
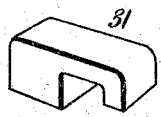
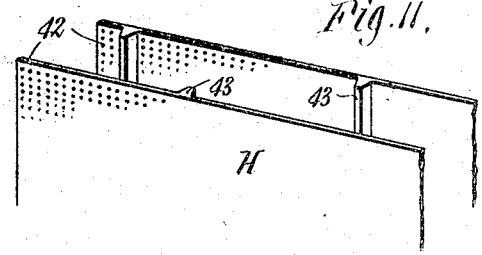
Witnesses:
E. A. Volk
A. J. Dimond
Rufus N. Chamberlain } Inventors.
Herbert E. Pratt
Albert S. Hubbard
by Wilhelm Parker Hard
Attorneys.

UNITED STATES PATENT OFFICE.

RUFUS N. CHAMBERLAIN AND HERBERT E. PRATT, OF DEPEW, NEW YORK, AND ALBERT S. HUBBARD, OF BELLEVILLE, NEW JERSEY, ASSIGNORS TO GOULD STORAGE BATTERY COMPANY, OF NEW YORK, N. Y.

STORAGE BATTERY.

No. 930,728.

Specification of Letters Patent.

Patented Aug. 10, 1909.

Application filed December 17, 1906. Serial No. 348,282.

*To all whom it may concern:*

Be it known that we, RUFUS N. CHAMBERLAIN and HERBERT E. PRATT, citizens of the United States, residing at Depew, in the county of Erie and State of New York, and ALBERT S. HUBBARD, a citizen of the United States, residing at Belleville, in the county of Essex and State of New Jersey, have invented a new and useful Improvement in Storage Batteries, of which the following is a specification.

This invention relates mainly to that class of storage batteries in which lightness and compactness are important desiderata, as, for instance, the batteries which are used in submarine boats and similar vessels.

The objects of the invention are to so construct the jar or tank of the cell, the battery plates and connecting parts, that the height of the cell is reduced without interfering with the removal of the battery plates; to provide strong, light and efficient separators; to provide means for thoroughly cooling the jar or tank by circulating air; and to improve the cell in other respects.

In the accompanying drawings, consisting of three sheets: Figure 1 is a longitudinal sectional elevation of a battery cell provided with these improvements. Fig. 2 is a horizontal section in line 2—2, Fig. 1. Fig. 3 is a vertical cross section in line 3—3, Fig. 1. Fig. 4 is a perspective view of one of the crates. Fig. 5 is a fragmentary perspective view of portions of the crate detached. Fig. 6 is a vertical section of the upper portion of one of the outer walls of the crate. Fig. 7 is a fragmentary vertical cross section in line 7—7, Fig. 1. Fig. 8 is a fragmentary side elevation of two adjacent bus bars and connecting parts. Fig. 9 is a fragmentary side elevation of two bus bars and an extension thereof of a modified construction. Fig. 10 is a perspective view of one of the spacing pieces. Fig. 11 is a fragmentary perspective view of one of the duplex separators.

Like letters and numerals of reference refer to like parts in the several figures.

A represents the jar or tank of the cell and B the cover thereof, both preferably made of strong hard rubber. The jar is constructed with a top portion 20 which is offset outwardly, forming an internal shoulder 21 on the four sides of the jar and above said shoulder an internal recess 22, which is interrupted on two opposite sides of the jar by lugs or bosses 23 extending above the shoulder to the proper height for supporting the cover B at two sides.

C and D represent the two sets of battery plates arranged in the jar and supported on two upright glass plates E which are preferably arranged to converge slightly in an upward direction. The jar is provided on two opposite sides, at the junction of its bottom with two of the upright walls, with a reinforcement 24 having a groove 25 in which the lower end of the glass plate is seated and whereby the plate is prevented from shifting its position under the movements to which the battery may be subjected when used in a vessel or vehicle.

F and G represent the bus bars which connect, respectively, the lugs of the plates C and D. Each of these bars is arranged in the recess 22 above the shoulder 21 of the jar and is connected to the lugs of the corresponding set of plates by burning, the bus bar F being burned to the connecting lugs 26 of the plates C and the bar G to the connecting lugs 27 of the plates D. Each bus bar is constructed with an extension which extends upwardly in the recess 22 and over the top edge of the offset portion 20 of the jar, and is burned to the corresponding extension of the bus bar in the adjacent cell. 28 represents the extension of the bus bar F and 29 that of the bus bar G. Fig. 8 represents these parts relative to the bus bar F before they are joined by burning and shows this bus bar provided with lugs 30 which are joined to the lugs 26 of the plates C by burning.

31, Figs. 1, 2, 3 and 10, represents insulating spacing pieces of rubber which are applied to the tops of the glass plates E between the supporting lugs 32 of the battery plates for spacing and separating the plates.

H represents the separators which are interposed between adjacent battery plates and which rest upon a four-sided frame I which in turn rests upon the bottom of the jar and are held down by a four-sided frame K upon which the cover B bears. The cover rests upon the supporting lugs 23 of the jar and is held down by binding posts 33 formed on two of the plates. The cover is provided with vents 34 of any suitable construction.

In order to prevent injury to the hard rubber jar during the operations of burning the bus bars to the lugs of the plates and of burning the extensions of adjacent bus bars, the top portion of the jar is protected by fire proof facings 35 and 36, applied, respectively, to the inner side and top of the offset top portion 20 of the jar. These facings are preferably formed of mica plates.

The bus bars are arranged within the top recess 22 of the jar above the shoulder 21 thereof, and do not extend above the jar except in so far as the extensions 28 or 29 of the bars extend above the jar and this projection is inconsiderable. The height of the cell is thereby kept comparatively low. Each bus bar and its extension is located outside or beyond the outermost edges of the adjacent supporting lugs 32 of the opposing set of battery plates and therefore does not interfere with the free removal of the opposing set of plates from the jar. As described, each bus bar may be formed with an extension 28 and the extensions of adjacent bus bars may be united by burning, but other constructions may be employed, for instance, a single saddle-shaped extension 37, Fig. 9, may be united to adjacent bus bars. In either case the top recess 22 of the jar receives the bus bar and its extension and places these parts out of the way of the opposing set of battery plates.

The rubber jar is provided with a suitable number of feet or base pieces 40, four being preferred, which rest upon the rubber lining 41 of the compartment in which the cell is arranged. These base pieces support the bottom of the jar at a sufficient height to form circulating channels for air underneath the bottom and also to leave sufficient space for the reception of any acid which may be spilled out of the jar. Usually in installing such batteries for submarine boats sixty cells are employed, arranged in two sets of thirty each in two lead-lined compartments.

The separators H consist each of two like perforated plates having upright ribs on one side and arranged with their ribbed sides toward each other. The ribs have a staggered arrangement so that the rib of one plate stands about midway between two ribs of the opposing plate. The plates and ribs are preferably formed of hard rubber and the ribs are cemented or otherwise secured to or formed on the plates. Two of these ribbed plates placed with their ribbed sides against each other form a duplex separator having comparatively large upright flow passages or channels between adjacent ribs. In the duplex separators shown in the drawings, each perforated plate 42 is provided with three upright ribs 43, so that two of these plates in face to face contact form five upright flow channels between the six ribs, while each plate has only three ribs.

The duplex separator is quite stiff and strong and can be easily and conveniently handled without danger of breakage and is at the same time very light, which is a consideration of great importance in batteries designed for use on submarine vessels. The perforations of the separator plates are smaller than the distance between two plates to make sure that any solid particle which might be small enough to pass through one of the perforations is also small enough to fall freely through the upright channel to the bottom of the jar and so prevent short circuiting.

In order to properly space the individual cells and to provide channels through which the air can circulate freely in contact with the jars to cool the same, a crate or frame is provided for the reception of the cells. This crate or frame consists of side walls 50, end walls 51, longitudinal partitions 52 and transverse partitions 53. The partitions consist each of several superposed strips which are provided at the crossing points with notches 54, 55 in such manner that the strips of the longitudinal partitions interlock with those of the transverse partitions, as shown in Fig. 5. The outer walls are provided on their inner sides with upright grooves 56 and the partitions are provided on both sides with upright grooves 57 which operate as upright channels for the circulation of air along the jars placed in the sockets of the crate or frame.

The partitions may be arranged with their ends in those channels of the outer walls which coincide with the partitions and the walls and partitions may be secured together by screws or nails.

The crate or frame, which is open at the bottom, rests upon the lead lining 58 of the compartment 59 in which the group is arranged and the walls and partitions are provided in their lower edges with notches 60 for the admission of air to the upright circulation passages and to the under sides of the jars.

In cells for submarine boats the injurious development of heat has been very common, owing to the meager facilities for carrying off the generated heat which were heretofore provided. The above described system of air circulation remedies the difficulty effectually.

We claim as our invention:

1. The combination of a battery jar having on its inner side at the top a transverse recess extending across the jar, a set of battery plates arranged within the jar, a transverse bus bar connecting said plates and arranged within said recess, and a vertically disposed plate of insulating material within the jar and serving as a support for the battery plates at the ends opposite to those connected to the bus bar.

2. The combination of a battery jar having on each of its inner opposite sides at the top, a transverse recess extending across the jar, a set of battery plates arranged within the jar, a transverse bus bar arranged in each recess and connected to the ends of alternate adjacent plates, and vertically disposed plates of insulating material within the jar, and serving as supports for the battery plates at the ends opposite to those connected to the bus bars.

3. The combination of a battery cell and a crate having its walls provided with upright air channels adjacent to the cell and having bottom openings for the admission of air to said channels, substantially as set forth.

4. The combination of battery cells and a crate comprising outer walls and intersecting partitions forming pockets for the cells, said walls and partitions being formed in their inner sides with upright air channels and having bottom openings for the admission of air to said channels, substantially as set forth.

5. The combination of battery jars having feet whereby the bottoms of the jars are raised above their supports and a crate comprising outer walls and intersecting partitions forming pockets for the cells, said walls and partitions being formed in their inner sides with upright air channels and having bottom openings for the admission of air to said channels, substantially as set forth.

RUFUS N. CHAMBERLAIN.
HERBERT E. PRATT.
ALBERT S. HUBBARD.

Witnesses as to the signature of Rufus N. Chamberlain:
EDWARD WILHELM,
C. B. HORNBECK.

Witnesses as to the signature of Herbert E. Pratt:
FRED. C. GEYER,
GEORGE W. WENZ.

Witnesses as to the signature of Albert S. Hubbard:
R. H. WATSON,
DAISY B. BURNS.